Sept. 30, 1969　　　　　J. W. O'CONNOR　　　　　3,469,646
HYDRAULIC MOTOR DRIVEN STEERABLE WHEEL
Filed March 29, 1967　　　　　　　　　　　　2 Sheets-Sheet 1

Inventor
John W. O'Connor
By
Attorney

Sept. 30, 1969　　　J. W. O'CONNOR　　　3,469,646
HYDRAULIC MOTOR DRIVEN STEERABLE WHEEL
Filed March 29, 1967　　　　　　　　　　2 Sheets-Sheet 2

Inventor
John W. O'Connor
Attorney

United States Patent Office 3,469,646
Patented Sept. 30, 1969

3,469,646
HYDRAULIC MOTOR DRIVEN
STEERABLE WHEEL
John W. O'Connor, Milwaukee, Wis., assignor to Allis-
Chalmers Manufacturing Company, Milwaukee, Wis.
Filed Mar. 29, 1967, Ser. No. 626,875
Int. Cl. B62d 7/00; B60k 3/00, 9/00
U.S. Cl. 180—43                                    4 Claims

ABSTRACT OF THE DISCLOSURE

A motor driving a vehicle wheel and having an axis of rotation coincidental with a pivotal steering axis of the vehicle wheel.

---

This invention relates to vehicle suspension and more particularly to a vehicle wheel drive unit and steering mechanism.

The conventional vehicle is driven by rear wheel drive powered by an engine supported on the vehicle. For most purposes this type of a draft vehicle is satisfactory. However, under adverse conditions where the traction for the vehicle rear wheels is not sufficient to handle the draft load it may be desirable to increase traction by employing individual power units for driving each of the front wheels.

This invention employs hydraulic units with each unit connected individually to a mating front wheel assembly to provide a convenient and adaptable means for driving the front wheels. A plurality of flexible conduits connect the pump which is located on the vehicle body to the hydraulic drive units which are pivotally connected to the front wheel assemblies. These units are attached to the front wheel assembly in a manner that they do not turn when the vehicle wheel is turned. The torque reaction of the hydraulic unit counteracts tractive moments of force about the kingpin center line thereby reducing the loading on the wheel mounting structure. The hydraulic units is also spring mounted to reduce the effect of momentary deflection and misalignment due to shock as the wheel travels over rough terrain.

It is an object of this invention to provide a drive motor for a steerable wheel on a vehicle.

It is another object of this invention to provide a drive motor mounted on a vehicle and driving through an axis of rotation coincidental with the kingpin axis for a steerable wheel.

It is a further object of this invention to provide a motor mount for a drive motor driving through an axis of rotation coincidental with the pivotal axis about which a vehicle wheel pivots when the wheel is steered.

The objects of this invention are accomplished by providing a motor for driving a steerable wheel which is mounted on the vehicle and pivotally connects the wheel assembly through a pivotal axis which also defines a pivotal axis about which the front wheel pivots when the vehicle wheel is being steered. The drive shaft of the drive motor drives through a transmission in the vehicle wheel assembly which in turn drives a gear which is integral with the driven wheel. The wheel rotates about an axis substantially perpendicular to the pivotal axis about which the wheel is steered. Steering means is also provided on the vehicle which pivotally connects to the wheel assembly to pivot the wheel about an axis coincidental with the drive shaft of the drive motor. In other words, the kingpin ordinarily used on a steerable wheel is replaced by the motor drive shaft and motor mount which pivotally connects the motor to the vehicle. The vehicle suspension and steering mechanism is substantially simplified while a drive motor is provided to drive each of the vehicle wheels.

The preferred embodiments of this invention will be described in the following paragraphs and illustrated in the attached drawings.

Figure 1:
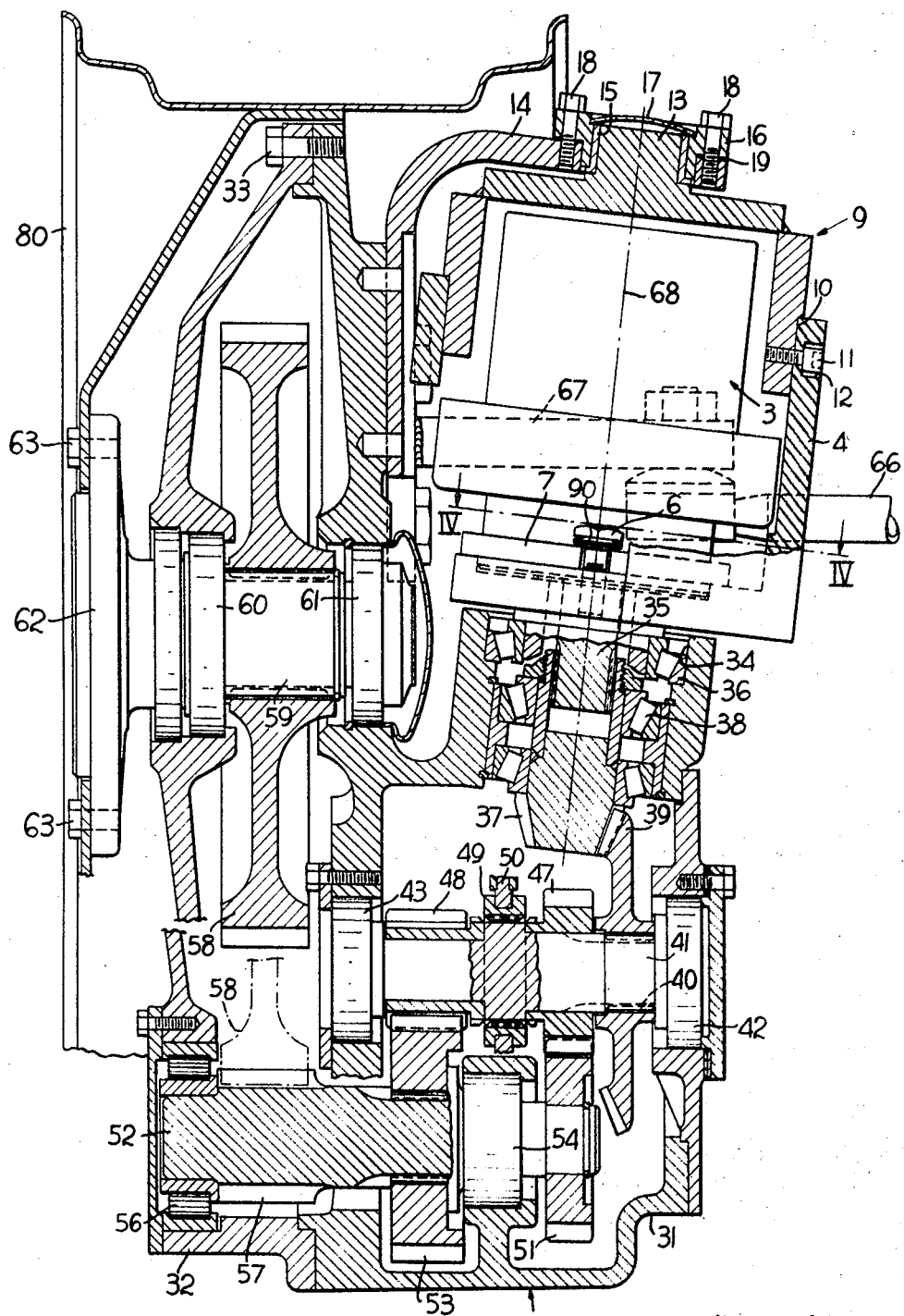
FIG. 1 illustrates a cross section view of the vehicle drive unit and the steering mechanism.
Figure 2:
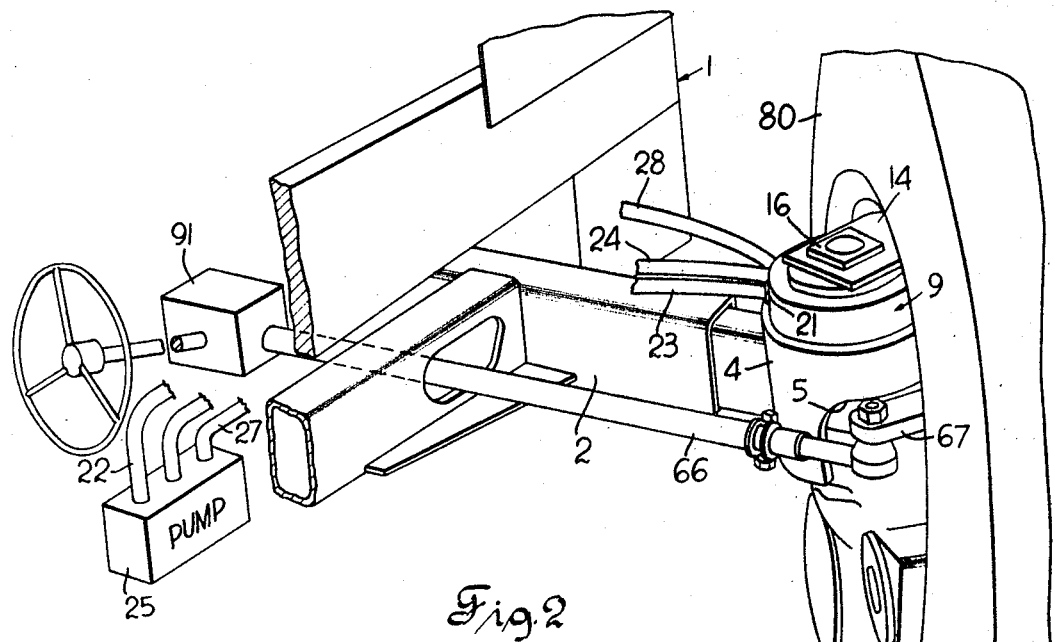
FIG. 2 illustrates a rear view of the steering mechanism in connection with the right hand vehicle wheel.
Figure 3:
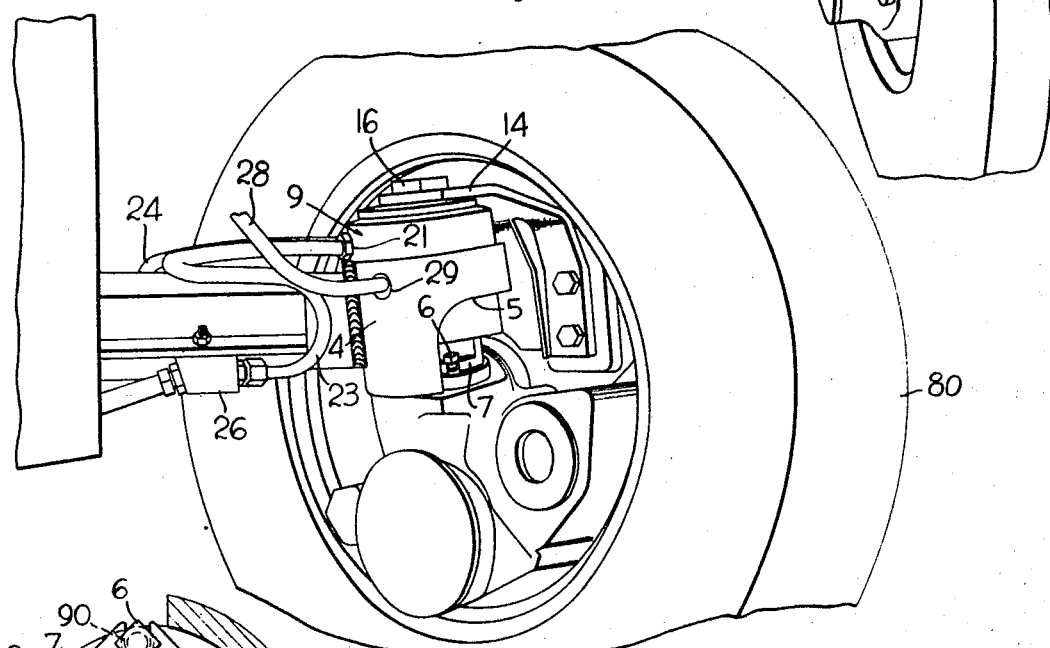
FIG. 3 illustrates a front view of the left hand vehicle wheel and drive unit.
Figure 4:
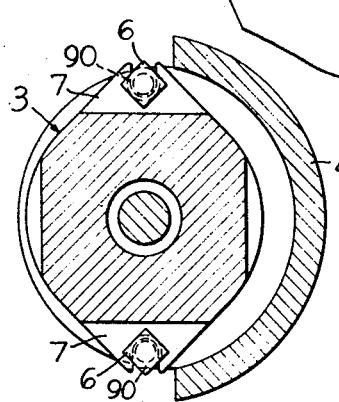
FIG. 4 is a fragmentary enlarged view of the motor fastening taken on line IV—IV of FIG. 1.

Referring to the drawings FIG. 2 generally illustrates the drive wheel supporting the vehicle body 1 which is provided with an axle 2. The axle as shown can rock or tilt within limits about a longitudinal axis centrally located with respect to the vehicle body. The drive motor support 4 for motor 3 is integrally supported on the front axle 2. For the purpose of illustration the motor will be called a hydraulic motor, although any type of motor including a hydrostatic motor could be used. A single wheel assembly and drive motor and the one end of the front axle is shown since the opposite side of the tractor is symmetrical and any description pertaining to it will merely be superfluous. A portion of the motor support is cut away at 5 to provide access to the motor mounting cap screws 6. A horizontal plate 7 is rigidly secured to the lower portion of the motor 3. Positioned under the cap screws 6, which are located diametrically opposite of the motor axis, are conical spring washers 90 of suitable resilience to absorb shock which is transmitted through the motor to the plate or motor mount. The resilience will avoid damage from shock transmitted through the wheel. A hydraulic motor support 4 is provided with an annular pivot cap 9, the lower reduced diameter portion 10 being received by the upper portion of the motor support 4 and rigidly secured thereto by circumferentially spaced cap screws 11 which are received by aligned countersunk holes 12 in the support 4 and threaded openings in the pivot cap 9. The upper end of pivot cap 9 is provided with a short stub shaft 13 which is pivotally received by the support bracket 14, the pivot connection consisting of a bronze bushing 15, retainer cap 16 and plug 17. The retainer cap 16 is secured to the support bracket 14 by means of the cap screws 18 and adjusted for end play by means of the shims 19.

The drive motor 3 is provided with openings 21 for receiving the conduits 23 and 24. The conduits 23 and 24 are connected to a source of pressurized fluid such as a pump schematically illustrated at 25, by means of a coupling or junction block 26 and conduits 22 and 27. The coupling block 26 is secured to the axle of the vehicle. A drain hose 28 connected through a port in the motor extends outwardly through the opening 29 in the motor support 4 and pivot cap 9 to connect to the pump It should be pointed out that the conduit or hose connections between the hydraulic motor, the pump, and sump could be accomplished in different ways, for instance, flexible conduits could extend directly from the pump to the motor. However, the feature of having the hydraulic motor stationary on the axle and the steerable vehicle wheels pivotal about the kingpin axis and the axis of the motor necessitates only enough slack to accommodate limited oscillation of the front vehicle axle.

The front drive wheel units drive through a transmission unit indicated generally by the reference numeral 30. Each transmission unit 30 includes an inner transmission housing 31 having outer transmission housing 32 rigidly secured thereto by means of the cap screws 33. Aperture 34 in the inner transmission housing 31 accommodates the motor support 4 and drive shaft 35 of the hydraulic motor 3. The wheel and assembly pivots about the rotational axis of the motor 3 on antifriction bearings 36 for steering, and the drive shaft 35 has a bevel pinion gear 37 splined to the free end thereof for rotation therewith on suitable antifriction bearings 38. The pinion 37 is in continuous meshing engagement with a gear 39 mounted by the splines 40 and shaft 41. The shaft 41 is disposed at substantially right angles to the motor drive shaft 35 and has opposite ends thereof journaled by antifriction bearings 42 and 43 which are mounted in opposite walls of the inner transmission housing 31. The pinion 37 and the ring gear 39 are a spiral bevel set which results in quiet and smooth running operation.

A high range pinion gear 47 and a low range pinion gear 48 are mounted on a shaft 41 and are selectively engageable therewith by means of a sliding clutch collar 49. The actuation of this type of clutch is accomplished by means of shifter fork mechanism 50 which is actuated by suitable device not shown.

The high and low range pinion gears 47 and 48 are disposed for continuous meshing engagement with the gears 51 and 53 mounted by splines on the pinion shaft 52 the inner end of which is journaled by antifriction bearings 54 mounted in the inner transmission housing 31 while the outer end of said shaft is journaled by antifriction bearing means 56 mounted in the outer transmission housing 32. The shaft 52 has an integrally formed pinioned gear portion 57 which is in continuous meshing engagement with the gear 58 mounted by splines on the shaft 59 which is journaled by antifriction bearings 60 and 61 mounted in the transmission housing 31 and 32. The outer end of the shaft 59 includes an integrally formed wheel hub flange 62 to which the wheel is detachably secured by suitable cap screws 63.

It should be understood that the collar 49 is axially slidable by actuation of a shifter fork mechanism 50 in one direction for effecting driving engagement of the pinion gear 47 with the shaft 41 to condition the transmission for high gear ratio or speed range and in the opposite direction for engaging a pinion gear 48 with shaft 41 to condition the transmission for low gear ratio or speed range, selectively providing one of two change speed power trains through the transmission. With clutch collars 49 neutrally positioned axially so as to be out of engagement with pinion gears 48, 47 the power train through the transmission is interrupted and the unit conditioned for neutral operation.

Referring to FIG. 2, a suitable steering mechanism 91 is connected to the tie rod 66 which is pivotally connected to the arm 67 which is fastened to the wheel assembly to steer the vehicle wheel in response to manual operation. The pivotal movement of the wheel during the steering operation causes the wheel to pivot about the axis 68 which is coincidental with the axis of rotation of the motor 3. The device substantially simplifies the combination mechanism of an individual drive motor and steering means for a steerable wheel by providing a common axis of rotation.

The operation of the device will be described in the following paragraphs. The inner transmission housing 31 and the bracket 14 provide a motor mount which supports the motor 3 in a fixed relation to the axle. The motor 3 drives the shaft 35 and transmits power through the transmission to the wheel 80. The transmission is operated manually through selectively activating the shift collar 49 to shift the transmission into the low range, the high range or the neutral position. The bracket 14 pivotally connects to the motor mount on its top end while the inner transmission housing 31 pivotally connects the motor mount on its lower end to function as a kingpin for pivotal movement of the wheel. The wheel 80 pivots about the axis 68 which is coincidental with the axis of the drive shaft 35.

A front axle as shown is an axle for a tractor and provisions are made for extending laterally the axle length. This provision is made to provide a variable tread width depending on work requirements. As disclosed the hydraulic conduits have a certain degree of slack which permits the extension.

The embodiments of the invention in which an exclusive property or privilege is claimed are defined as follows:

1. A vehicle wheel drive and steering mechanism comprising, a vehicle body means including a front axle, a steerable drive wheel rotatably mounted on a wheel support positioned in said wheel for carrying said front axle, a motor mounting housed in part by said wheel support and integral with said front axle, said wheel support pivotally connected to said motor mounting and defining a vertically inclined pivotal kingpin axis, a hydraulic motor including a shaft supported by said motor mounting, transmission means drivingly connecting said shaft to said wheel, said shaft defining a rotatable drive axis coincidental with the pivotal kingpin axis, a source of pressurized fluid on said body means having conduit means connected to said motor for driving said motor, a steering device on said vehicle body means connected to said wheel support for pivotally steering said wheel about said pivotal kingpin axis to thereby provide a common pivotal steering axis for said wheel and drive axis for driving said wheel.

2. A vehicle wheel drive and steering mechanism as set forth in claim 1 wherein said transmission means includes gearing connected between said drive motor and said wheel.

3. A vehicle wheel drive and steering mechanism as set forth in claim 2 wherein said transmission means includes a plurality of transmission gear speed ranges and a means for selectively engaging one of said speed ranges in said transmission.

4. A vehicle wheel drive and steering mechanism as set forth in claim 1 wherein resilient means supports said motor on said motor mounting whereby to absorb roughness and shock transmitted from the wheel through the motor to said resilient means on said axle.

References Cited

UNITED STATES PATENTS

| 3,225,855 | 12/1965 | Sherwen | 180—43 |
| 1,310,542 | 7/1919 | Pratt | 180—26 |
| 2,789,648 | 4/1957 | Huffman | 180—26 X |
| 2,820,524 | 1/1958 | Bear | 180—52 |
| 3,057,426 | 10/1962 | Hastings | 180—52 |

FOREIGN PATENTS 112,609  2/1941  Australia.

A. HARRY LEVY, Primary Examiner

U.S. Cl. X.R.

180—55, 66, 64